March 30, 1926.
L. M. PERKINS
1,578,913
GENERATOR
Filed Oct. 20, 1920
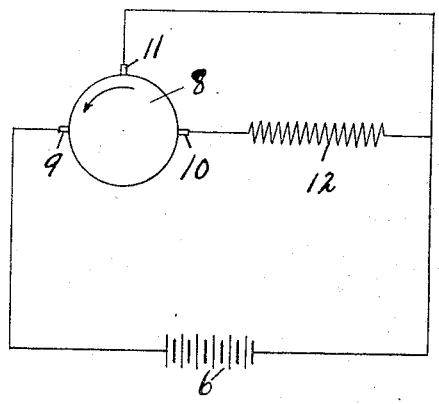
INVENTOR
L. M. Perkins
BY
ATTORNEYS

Patented Mar. 30, 1926.

1,578,913

UNITED STATES PATENT OFFICE.

LAURENCE M. PERKINS, OF SYRACUSE, NEW YORK.

GENERATOR.

Application filed October 20, 1920. Serial No. 418,181.

*To all whom it may concern:*

Be it known that I, LAURENCE M. PERKINS, a citizen of the United States and a resident of Syracuse, in the county of Onondaga, in the State of New York, have invented new and useful Improvements in Generators, of which the following, taken in connection with the accompanying drawings, is a full, clear, and exact description.

This invention relates to certain improvements in generators with special reference to third brush generators.

The primary object of the invention is to improve the efficiency, commutation and characteristics of the third brush generator. Other objects and advantages will be apparent from the following description taken in conjunction with the accompanying drawing in which:

The figure illustrates diagrammatically an embodiment of the invention.

Referring now more particularly to the drawing the generator comprises an armature 8 provided with brushes 9, 10 and 11, brush 9 being positioned substantially on neutral while brush 11 is positioned off neutral in the direction of rotation at an angle less than 180 electrical degrees from the brush 9. The angular position of the brush 11 is determined somewhat by the generator design and the desired output, but in practice the brush 11 is positioned off neutral in the direction of rotation to such an extent that the angle between the two brushes 9 and 11 varies between 60 electrical degrees and 150 electrical degrees.

The brush 11 is preferably placed in such a position in the field that the density at that point is relatively low instead of being placed in a position of maximum field density.

The brushes 9 and 11 are connected in circuit with an external source of potential, such as the battery 6, the load current flowing from brush 9 through the battery 6 and back to the brush 11. The brush 10, before mentioned, is placed substantially at or near the other neutral point of the armature 8 opposite the brush 9.

A shunt field winding 12 is provided which winding is energized from brushes 10 and 11. From the above description it will be apparent to those skilled in the art that the efficiency of generators is increased by the present construction for the reason that the load current passes through only that portion of the armature between brushes 9 and 11, and because the field current passes through a smaller section of the armature due to the position of the control brush, and still further because the load and field currents pass through certain sections of the armature in opposite directions, thus reducing the heating effects in those sections, and still further because of the better commutation causing less short circuit loss in the brushes, especially in brush 11, which in this type of generator may be placed in a portion of the field in which the field density is relatively low instead of being placed in the field at or near a point of maximum density.

Commutation is improved because of the position of brush 11 in the field of low density and because one of the brushes no longer has to carry the sum of the shunt field and battery current but rather their difference. It is to be noted that the brush 9 carries the battery current only, and brush 10 carries the field current only, while brush 11 carries the difference between the battery and field current.

It is believed that the invention will be fully apparent to those skilled in the art to which it appertains, but it is to be understood that the drawings herewith are for illustrative purposes only and that various changes may be made within the scope of the appended claims without departing from the spirit of the invention.

What I claim is:

1. The combination with a variable speed generator having a brush substantially on neutal and a brush off its neutral to such an extent that the angle between the two brushes is less than 180 electrical degrees, an external source of E. M. F. connected to said brushes, and a third brush substantially on the other neutral point, of a shunt field connected between the brush which is off neutral and said third brush.

2. The combination with a variable speed generator, a brush substantially on neutral, a brush off neutral in the direction of rotation to such an extent that the angle between the two brushes is less than 150 electrical degrees and more than 60 electrical degrees, an external source of E. M. F. connected to said brushes, a third brush substantially on the other neutral point and a shunt field connected between the brush which is off neutral and said third brush.

3. In combination, a variable speed generator, a brush positioned substantially on neutral, a brush positioned off its neutral in the direction of rotation at a point of relatively low field density, an external source of E. M. F. connected to said brushes, a third brush substantially on the other neutral point, and a shunt field connected between the brush which is off neutral and said third brush.

4. The combination with a variable speed generator, a brush substantially on neutral, a brush positioned off its neutral to such an extent that the angle between the two brushes is less than 180 electrical degrees, and an external source of E. M. F. connected to said brushes, of a shunt field winding.

5. The combination with a variable speed generator, a brush positioned substantially on neutral, a brush positioned off its neutral at a point of relatively low field density and an external source of E. M. F. connected to said brushes, and a third brush substantially on the other neutral point, of a shunt field connected between the brush which is off neutral and said third brush.

6. A variable speed generator having regulating means responsive to armature reaction, a brush substantially on neutral and a second brush off its neutral in the direction of rotation of the generator to such an extent that the angle between said two brushes is less than 180 electrical degrees and means for deriving load current from said two brushes only.

7. A variable speed generator comprising in combination an armature, a brush substantially on neutral, a brush off its neutral to such an extent that the angle between the two brushes is less than 180 electrical degrees, an external source of E. M. F. connected to said brushes, a third brush substantially on the other neutral point and a shunt field connected between the brush which is off neutral and said third brush.

In witness whereof I have hereunto set my hand this 9th day of October, 1920.

LAURENCE M. PERKINS.